Dec. 20, 1927.

W. BAUERSFELD 1,653,426

MACHINE FOR MAKING CIRCLE DIVISIONS

Filed Jan. 4, 1923

Inventor:
Walther Bauersfeld

Patented Dec. 20, 1927.

1,653,426

UNITED STATES PATENT OFFICE.

WALTHER BAUERSFELD, OF JENA, GERMANY, ASSIGNOR TO THE FIRM OF CARL ZEISS, OF JENA, GERMANY.

MACHINE FOR MAKING CIRCLE DIVISIONS.

Application filed January 4, 1923, Serial No. 610,723, and in Germany January 24, 1922.

With the manufacture of circle-divisions the dividing disc is capable of carrying out slight motions relatively to the dividing tool owing to the play which, unavoidably, the axis of this disc has in its bearings. The present invention attempts to obviate the inaccuracies of the divisions to be obtained, possibly arising by the said play with the known dividing machines. The new dividing machine is provided with two cutting devices which are disposed opposite each other, symmetrically to the axis of the dividing disc, and the circle-division is made with the new machine by always drawing a line each way with both cutting devices for each position of the dividing disc. Hence, any inaccuracies produced by the aforesaid play are without effect on the result if the observer reads off the division at two places, opposite each other with respect to the centre, and takes the mean of both readings.

With the new machine it would suffice to only rotate the dividing disc through an angle of 180° since each of the two cutting devices draws the lines pertaining to one half of the periphery. In many cases, however, it would be preferable to carry out the division in the aforesaid manner over the whole periphery and to produce thereby two complete divisions. If the angle embraced by the two cutting devices relatively to the axis of the dividing disc be slightly different from 180°, a division is produced consisting of double lines, the middle of which represents the place where the reading is to be taken.

Figure 1:
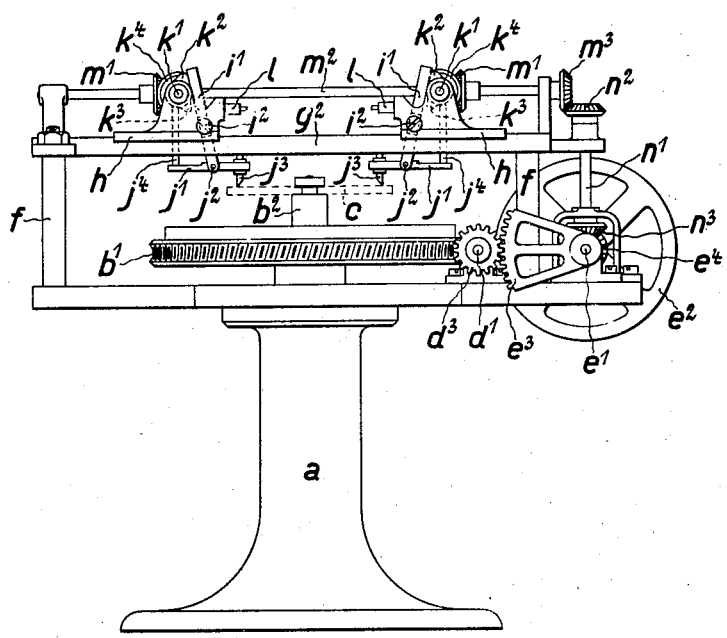
Figure 2:
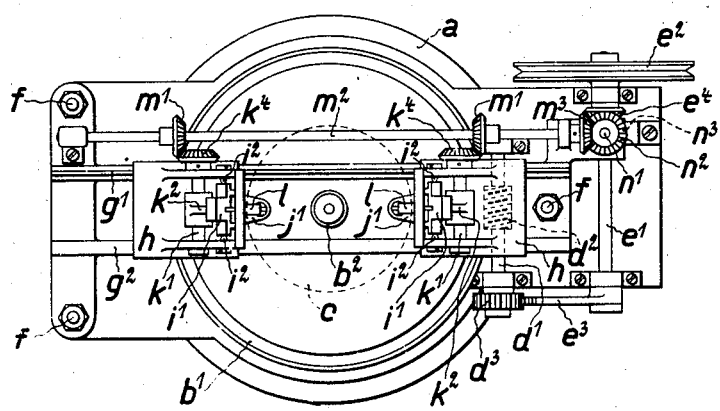

The annexed drawing shows in Fig. 1 a side elevation of a constructional example, whilst Fig. 2 is a plan elevation.

In a standard $a$ there is rotatably supported a worm wheel $b^1$, carrying at the top a bolt $b^2$ for fixing the disc $c$ to be divided. On the shaft $d^1$ of a worm $d^2$, engaging in the worm wheel, there is fixed a spur wheel $d^3$. A shaft $e^1$ carries at one end a cord pulley $e^2$ and on the other end a toothed wheel segment $e^3$ which coacts with the spur wheel $d^3$. With the aid of three pillars $f$ there is fixed on the standard $a$ a guide body, containing a prismatic carriage guide $g^1$ and a plane carriage guide $g^2$. Upon these guides slide two carriages $h$. In each of these two carriages there is pivotally mounted between points $i^2$ a lever $i^1$ on which another lever $j^1$ is again pivotally mounted about an axis $j^2$. At the one end of the lever $j^1$ there is fixed a cutting tool $j^3$ and at the other end a rod $j^4$. In each carriage is supported in addition a shaft $k^1$ carrying two cams $k^2$ and $k^3$. A spring which is assumed to be contained inside a bush $l$ keeps the free end of the lever $i^1$ in contact with the cam $k^2$, whilst the rod $j^4$ is kept in contact with the cam $k^3$ by the weight of the cutting device. On the shaft $k^1$ there is also fixed a bevel wheel $k^4$. The two bevel wheels $k^4$ mesh with a bevel wheel $m^1$ each, supported by a shaft $m^2$, which in its turn engages by a bevel wheel $m^3$ in a bevel wheel $n^2$ fixed on a shaft $n^1$. Another bevel wheel $n^3$ fixed on the shaft $n^1$ engages in a bevel wheel $e^4$ fixed on the shaft $e^1$.

If, on operating the graduating machine, the shaft $e^1$ be actuated by means of a cord running over the pulley $e^2$, the segment $e^3$ meshes during part of each revolution of the disc with the spur wheel $d^3$, so that the worm wheel $b^1$ with the disc $c$ to be divided is rotated to a certain extent by means of a worm $d^2$. During the other part of each revolution of the pulley $e^2$ the disc $c$ stops. However, during the stop of the disc $c$ each of the cams $k^2$ acts first on the appertaining lever $i^1$ and thereby causes the cutting device $j^3$ fitted to this lever to draw a division line in radial direction from within to without. Hereupon the cam $k^2$ releases the lever $i^1$ and each of the cams $k^3$ now acts upon the respective rod $j^4$. Consequently the lever $j^1$ lifts off the cutting device from the disc $c$ to be divided. In addition, however, the spring, disposed inside the bush $l$ and acting on the upper part of the lever, causes the cutting device (without coming now in contact with the disc $c$) to move again inwardly in radial direction.

I claim:

In a graduating machine a standard, a device rotatably disposed on the said standard and adapted to receive the article to be graduated, means for rotating the said device, two cutting tools, means for supporting these cutting tools approximately opposite each other with regard to the axis of rotation of the said device and adapted to operate in radial direction from said axis of rotation, and other means for actuating the said two cutting tools.

WALTHER BAUERSFELD.